Patented Oct. 20, 1953

2,656,289

UNITED STATES PATENT OFFICE 2,656,289

PROCESS AND COMPOSITION FOR WASHING GLASS

Dariel E. Miller, East Los Angeles, Calif., assignor to Kelite Products, Inc., Los Angeles, Calif., a corporation of California No Drawing. Application January 21, 1949, Serial No. 72,069

2 Claims. (Cl. 134—42)

This invention relates to a process and composition for washing glass to remove siliceous scale.

The loss of brightness in the use of glassware, and also glass windows, windshields, etc. is frequently due to the deposit thereon of a silica scale. Particularly where glassware is cleaned in restaurants, fountains, etc. it is found that after the cleaning or washing operation the glassware has a white film thereon which is due to a siliceous scale.

The general object of the present invention is to provide a composition and process for treatment of glass surfaces to remove such siliceous scale and brighten the surface of the glass or glassware. The problem of removing siliceous scale from glassware involves the application to the glass or glassware of a material which, on the one hand, will be reactive in dissolving such siliceous scale, and on the other hand be ineffective to attack, pit or etch the glass having the siliceous scale thereon.

The present invention is dependent on my discovery that potassium fluosilicate $K_2SiF_6$ in an acid solution is both effective to remove siliceous scale from glass surfaces and glassware but also may be applied to glassware without harmful effect on the glass surface, the glassware being unaffected and remains unpitted or etched after many prolonged treatments with the acid solutions of the potassium fluosilicate preparation.

I have also developed a composition in solid form which may be packaged as a dry free flowing granular powdered admixture and requires only the addition of water to form a solution containing the desired potassium fluosilicate and having suitable acidity so that the solution is effective for rapidly removing siliceous scale from glass surfaces and glassware without the danger of harmful effect thereon. I have found that by mixing potassium fluosilicate with sodium acid sulfate and sodium sulfate in proper proportions a solid, granular or powdered admixture may be obtained which is in the form of a free running solid preparation which will not cake in packaging and transportation. Such a solid preparation requires only the addition of water to produce an aqueous solution possessing not only the desired potassium fluosilicate in solution but also the correct acidity for the solution to be effective in removing siliceous scale from glass without danger of etching or pitting the glass.

The proportions of the ingredients of this composition may generally fall within the limits of 15 to 40% potassium fluosilicate $K_2SiF_6$; 40 to 60% of sodium acid sulfate $NaHSO_4$; and 50 to 10% of sodium sulfate $Na_2SO_4$ parts by weight.

In cleaning glassware with the composition of the present invention a concentration of potassium fluosilicate employed may vary somewhat depending upon temperature of the process but generally lies between the range of 0.03% and saturation. At lower temperature, for example at 17.5° C. the saturation value is 0.12 and the percentage used will generally be below this value. For example, when using a preparation consisting of 20 parts $K_2SiF_6$, 50 parts $NaHSO_4$, and 40 parts $Na_2SO_4$ a suitable treating solution is produced by adding from 3 to 6 ounces of such a preparation to a gallon of water. With such a preparation the scale on glass surfaces or glassware may be removed merely by immersing the glassware in the solution at ordinary temperatures, but preferably somewhat higher temperatures of 140° F. to the boiling point are preferred.

While the particular composition and process herein described are well adapted to carry out the objects of the present invention it is to be understood that various modifications and changes may be made and this invention is of the scope set forth in the appended claims.

I claim:

1. A composition for removing silica scale from glass surfaces by contacting the glass surface with an aqueous solution of the composition, said composition comprising: a solid admixture containing in percentage by weight from 15 to 40% potassium fluosilicate $K_2SiF_6$, from 40 to 60% of sodium acid sulfate $NaHSO_4$, and 50 to 10% of sodium sulfate $Na_2SO_4$.

2. A process of cleaning glass surfaces to remove silica scale without etching, which process comprises contacting glass surfaces with an aqueous solution of a solid mixture containing from 15 to 40% potassium fluosilicate $K_2SiF_6$, from 40 to 60% of sodium acid sulfate $NaHSO_4$, and from 50 to 10% of sodium sulfate $Na_2SO_4$, the percentages being by weight, sufficient of the admixture being employed to produce a solution containing from 0.03 to 0.12% potassium fluosilicate by weight, the process being conducted at a temperature of between 140° F. and the boiling point of the solution.

DARIEL E. MILLER.

References Cited in the file of this patent

UNITED STATES PATENTS

| Number | Name | Date |
|---|---|---|
| 1,016,928 | Bishop | Feb. 13, 1912 |
| 1,885,390 | Textor | Nov. 1, 1932 |
| 2,118,386 | Swinehart | May 24, 1938 |
| 2,413,365 | McCoy | Dec. 31, 1946 |

FOREIGN PATENTS

| Number | Country | Date |
|---|---|---|
| 318,344 | Great Britain | Sept. 5, 1925 |
| 449,275 | Great Britain | June 24, 1936 |
| 470,413 | Great Britain | Aug. 16, 1937 |